United States Patent [19]

Foglino

[11] Patent Number: 5,536,923
[45] Date of Patent: Jul. 16, 1996

[54] PAYMENT MEMORY MEDIUM AND METHOD OF USE THEREOF

[75] Inventor: Jean-Jacques Foglino, Peynier, France

[73] Assignee: Gemplus Card International, Gemenos, France

[21] Appl. No.: 299,996

[22] Filed: Sep. 1, 1994

[30] Foreign Application Priority Data

Sep. 2, 1993 [FR] France ................................ 93 10477

[51] Int. Cl.$^6$ ........................................... G06K 5/00
[52] U.S. Cl. ........................................ 235/380; 235/492
[58] Field of Search .................................. 235/492, 380

[56] References Cited

U.S. PATENT DOCUMENTS

| 4,764,666 | 8/1988 | Bergeron | 235/375 X |
| 4,992,646 | 2/1991 | Collin | 235/492 X |
| 5,128,997 | 7/1992 | Pailles et al. | 235/380 X |
| 5,178,389 | 1/1993 | Bentley et al. | 273/138 A |
| 5,179,517 | 1/1993 | Sarbin et al. | 364/410 |
| 5,191,193 | 3/1993 | Le Roux | 235/379 |
| 5,264,689 | 11/1993 | Maes et al. | 235/492 |
| 5,285,415 | 2/1994 | Depret et al. | 235/492 X |
| 5,371,345 | 12/1994 | LeStrange et al. | 235/380 |

FOREIGN PATENT DOCUMENTS

| 0227532 | 7/1987 | European Pat. Off. | G07F 7/08 |
| 0345108 | 12/1989 | European Pat. Off. | G07F 7/08 |
| 0356121 | 2/1990 | European Pat. Off. | G07F 7/02 |
| 0378454 | 7/1990 | European Pat. Off. | G07F 7/08 |
| 0498477 | 8/1992 | European Pat. Off. | G07F 7/02 |
| 2191029 | 12/1987 | United Kingdom | G07F 7/00 |

*Primary Examiner*—Donald T. Hajec
*Assistant Examiner*—Steven Wigmore
*Attorney, Agent, or Firm*—Nilles & Nilles

[57] ABSTRACT

A method of electronic payment comprising: providing a memory with an EPROM counter and a pointer; inserting the memory into a machine; decrementing the counter in steps which correspond to a unit of payment, in an irreversible manner, until the counter is equal to the pointer; stopping the decrementing; and incrementing the pointer, without removing the memory from the machine, when a gain is achieved in response to a random external event.

7 Claims, 2 Drawing Sheets

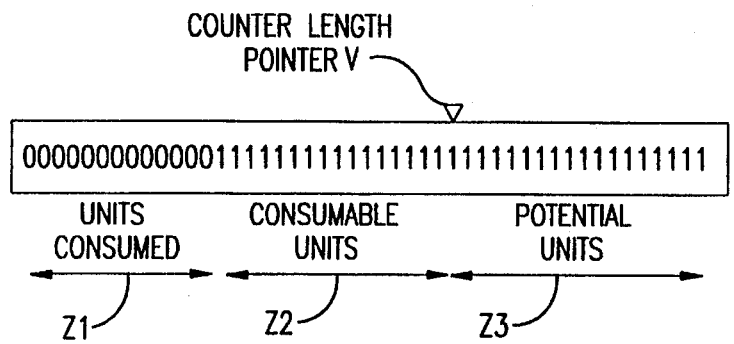
FIG.1
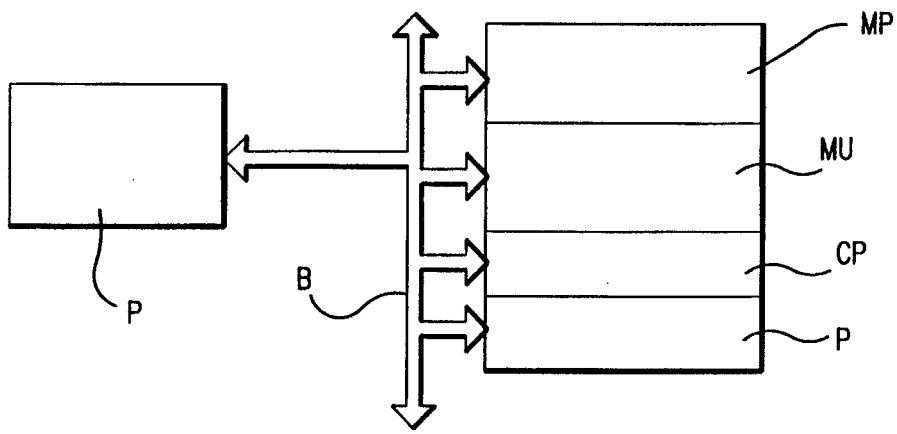
FIG.2
| 0 | MANUFACTURER | 7 | |
|---|---|---|---|
| 8 | AREA | 15 | |
| 16 | | 23 | |
| 24 | USER | 31 | READ-ONLY |
| 32 | AREA | 39 | |
| 40 | | 47 | |
| 48 | | 55 | |
| 56 | | 63 | |
| 64 | 0 \| $C_{4096}$ \| 000 | 71 | |
| 72 | $C_{512}$ | 79 | ERASABLE — ABACUS COUNT AREA |
| 80 | $C_{64}$ | 87 | |
| 88 | $C_8$ | 95 | |
| 96 | $C_1$ | 103 | |
FIG.3

PAYMENT MEMORY MEDIUM AND METHOD OF USE THEREOF

BACKGROUND OF THE INVENTION

The present invention concerns electronic payment processes, particularly those in which the payment medium consists of a card comprising integrated circuits, generally referred to as a "smart card". As part of the smart project, it has been suggested that a "token" smart card be used to pay small sums of money by means of an electronic system.

It is well known that a smart card is a plastic medium whose dimensions conform to ISO standards 2894 and 3554. One or more electronic components are installed on this medium which can include, for example, a microprocessor and, especially, a data memory with a storage capacity of several hundred bits, usually of EPROM type. As far as the smart card itself is concerned, this memory is of EPROM type.

The processing performed within a "token" type smart card consists of making a payment unit, referred to as a "token", correspond to each bit in an area of a data memory. The value of this token will be determined according to the use of the card. For example, one bit can correspond to a token with a value of one franc.

Payment takes place in a "sales point" terminal equipped with a card reader in which a transaction is carried out by cancelling, in the data memory, the number of bits required for payment. The cancelling of a bit consists of electrically changing a binary element in the memory from a binary condition of "1" corresponding to a credit of one unit to a binary condition of "0" corresponding to zero credit, or vice versa. Since the data memory is of EPROM type, this change is electrically irreversible.

The above description of the basic system is simple and makes it possible to fully understand the principle of the token card.

Various improvements have later been added to this system in order to make it possible, for example, to reload units into the card and to reduce the consumption of bits. Indeed, in the basic system the number of bits cancelled is equal to the number of units to be consumed and we are limited to the payment of small sums in order to avoid using components which are, for the time being, too costly with respect to the goal sought.

Yet no irreversible token type system is currently known which makes it possible to modify the face value of the card during the course of the card's life.

There are, however, applications for which such a payment system is not suitable. This is particularly the case when the owner of the card has the possibility of receiving gains, which gains thus modify the face value of the card. Such a situation may occur especially in the case of gambling machines where tokens are consumed in order to run the machine and where the result of the game can lead to the winning of additional tokens by the player. This is an extension of the well known replay system in "pinball" type electric games.

With a token card of the type currently known, when the player obtains a gain he must leave the machine in order to receive a payment for the gain achieved. If he wishes to continue playing, he must then start a new game, spending the number of tokens in his card until they run out despite the gains obtained. These gains are usually only available in the form of a free card containing additional tokens or otherwise in the form of cash received from a pay desk. Such an interruption of the game is detrimental to both the player, who does not usually wish to stop, and to the operator of the machine, for whom it is desirable that players remain as long as possible in front of the machine.

SUMMARY OF THE INVENTION

To solve this problem, the invention proposes an electronic payment process, particularly by means of a smart card, which makes use of a memory that includes a counter which is decremented (or incremented depending on the convention chosen) in an irreversible manner in steps, each of which correspond to a unit of payment, until a limit value corresponding to a face value of the card has been reached, with the main characteristics of this system being that a pointer which determines a limit value is used, that the incrementation of the counter is stopped once the value of the counter is equal to the value of the pointer, and that the value of the pointer is increased according to a random external event in order to simultaneously increase the face value of the card.

BRIEF DESCRIPTION OF THE DRAWINGS

Other characteristics and advantages of the invention stand out more clearly in the following description, which is nonlimiting provided merely as an example, and which refers to the attached drawings wherein:

FIG. 1 is a diagram illustrating the principle behind a memory making it possible to implement a process according to the invention;

FIG. 2 is a diagram illustrating a data processing system integrated in a smart card in order to implement the invention;

FIG. 3 is the mapping of a memory making it possible to implement the invention according to a preferred embodiment;

MORE DETAILED DESCRIPTION

Figure 4:
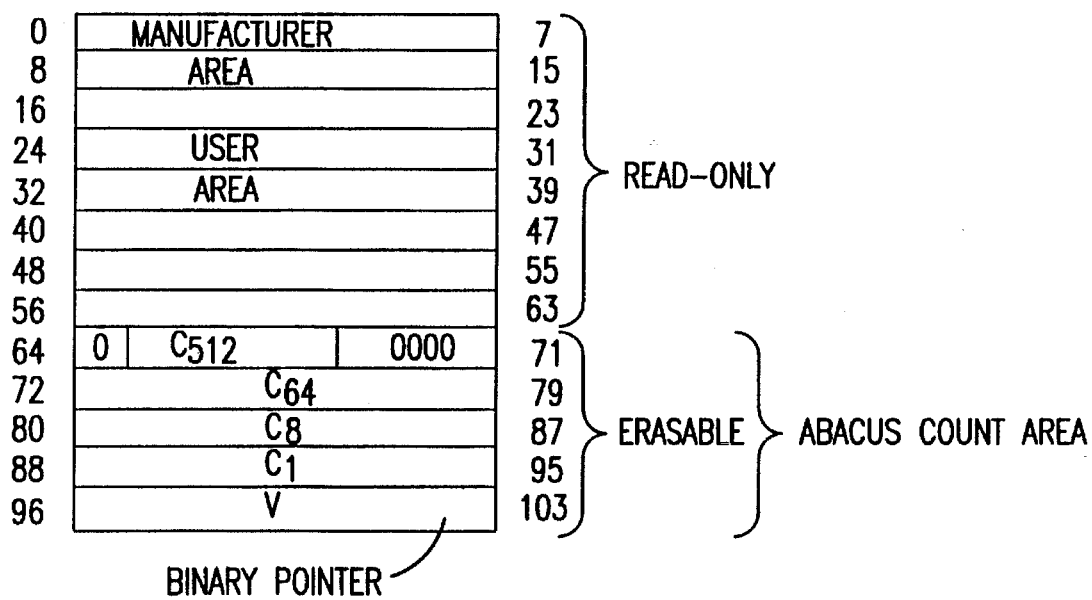
FIG. 4 is the mapping of a memory making it possible to implement the invention according to another preferred embodiment.

In FIG. 1, all the bits of an EPROM type memory M making up the core of a payment system according to the invention are shown in a linear manner.

In this memory, area Z1 comprising "0"s corresponds to units which have already been consumed, area Z2 comprising "1"s corresponds to units which can be consumed, and area Z3, which also comprises "1"s corresponds to potential units which can possibly be consumed in the event that a gain is obtained by the user of the system.

According to the invention, the face value of the smart card comprising memory M corresponds to a value given by the position of a pointer V which marks the boundary between areas Z2 and Z3 in memory M. When the card is purchased, this face value is therefore equal to the value obtained by adding areas Z1 and Z2, with the area Z1 shown in FIG. 1 which is full of "1"s.

When the user consumes units, area Z1 builds up and increases little by little through the cancelling of the bits in memory M. As long as the owner of the card has not obtained a gain, pointer V remains fixed and the face value of the card does not change.

When the owner of the card achieves a gain of one unit, the pointer is shifted, through the modification of the content of a counter for example, one unit towards the right of FIG. 1. This modifies the position of the boundary between areas Z2 and Z3, diminishing area Z3 and increasing area Z2. The face value of the card thus increases by one unit and the user therefore possesses of one additional unit which may be consumed. In the basic example mentioned above, this increase corresponds to the obtainment a replay. Obviously, the pointer can be shifted any number of units within the limits of the length of area Z3.

This thus yields a face value which can vary, only in an increasing manner, but this increase does not correspond to a reloading of the memory and there is therefore no decrease in the number of units consumed. This key point makes it possible to avoid all handling and possibilities for fraud which immediately come to mind when a reloadable system is considered. There are, of course, arrangements making it possible to theoretically avoid such fraud, but they are usually difficult to implement, result in the loss of running time, and lead to major costs, particularly due to the computing power to be used, especially computing power that must be integrated in the smart card.

FIG. 2 shows a simplified diagram of a system making it possible to implement the process according to the invention.

In this example, the payment system is achieved by means of an integrated circuit medium of a "smart card" type. Obviously, any other type of medium can be used.

Placed on this medium, there is, for the most part, a memory comprising an area MU in which payment units have been previously loaded. This memory can furthermore comprise a program memory MP making it possible to implement the application for which this card is intended. In this case, it is a program which handles the payment units in units memory MU. This program is also designed to control a units counter CP and a pointer P, with this counter and pointer conventionally corresponding to the contents of the specific CP and P areas of the memory. The program is particularly suited to modify the value of the pointer in order to change it from an initial value F to a value F+G, where G is the number of units to be credited, given that F+G is less than or equal to R, where R is the real number of units loaded in memory MU.

The smart card can furthermore comprise, in a manner already known of, a processing unit P of microprocessor type, in order to implement the application programs loaded in program memory MP. In the event where the smart card does not include such a microprocessor P, the programs are implemented by a microprocessor located, in a manner already known of, inside a smart card reader which is not shown in FIG. 2. This microprocessor P is linked to the memory in a manner already known of through a bus B.

According to a preferred embodiment of the invention, a single memory of units counting type is used, as shown in FIG. 3, which makes it possible to achieve the various functions previously described, (i.e. the units memory, the counter and the pointer). This memory can, for example, be of the type marketed by Applicant under reference GPM 103. In a more general manner, it is possible to use a card comprising a SIEMENS 4406, SGS-THOMSON 1305, ATMEL 88SC06 or PHILIPS 7960 integrated circuit, or any other equivalent integrated circuit.

This memory firstly comprises an 8 byte area corresponding to addresses 0 to 63, that is read-only, in which are stored items of information concerning the card, the manufacturer and the customer.

More specifically, this read-only area is usually divided into two sub-areas: 1) a manufacturer sub-area in which is generally written information such as the type of component, its version and the references of the manufacturer, the component, the card, and the application program; and 2) a user sub-area in which is written data such as the card's serial number, the date and the distribution center.

The memory furthermore comprises a count area located between addresses 64 to 103 and divided into five count levels each comprising 8 bytes and referred to in the figure as C1, C8, C64, C512 and C4096. The first four levels C1 to C512 are of erasable type, i.e. it is possible to erase the bits written within and later rewrite a bit in this same location. On the other hand, the fifth level C4096 is used as a write-once type given, as we shall see, the way the counter is used. Furthermore, this fifth level comprises four cells, (i.e., the first and the last three), which are written as "0" upon manufacturing and which can subsequently no longer be rewritten.

This count area is designed to operate like an abacus, i.e. the cells are written one after another counting one bit each time. Nevertheless, since such a method would only make it possible to count a limited number of bits, once a level is full, when the next bit arrives it is written in the first cell of the higher level and the entire lower level is cleared. This lower level is then progressively filled until it is full, and so on . . . Hence, the cells of level C1 will have an order of 1, those of level C8 an order of 8 . . . and the cells of level C4096 an order of 4096. This explains the names given to these levels.

This abacus-like operation is well known and is explained in greater detail in the manual of card GPM 103, which is publicly available.

Furthermore, according to a particularly interesting characteristic of the invention, as shown in FIG. 4, it is possible to increase the operation of the low-order levels with respect to that of the high-order levels in such a way as to use these low-order levels as a typical binary counter while maintaining the abacus type counter operation of the high-order levels.

This characteristic makes it possible to use the count area of this memory to implement the invention.

In this case and according to a specific example, levels C1 to C512 will be reserved for counting the units. This count will be performed by writing the bits one after another from the first bit of level C1 until the last writable bit of level C512. It is thus possible to count a total of 2120 units, or tokens, given three bits available in level C512.

To determine the face value of the card, counter V is then used in order to determine the value of the pointer there by precisely fixing the face value of the card. This face value will be that which is determined upon the customization of the card before its distribution and subsequently the face value will increase according to the possible gains obtained by the owner of the card, through increments of counter V.

When the card is used, upon each attempt to increment carried out by the counter made up of levels C1 to C512 and corresponding to a request for the consumption of a unit, the system will compare the value reached by the abacus counter with the value written in counter V corresponding to the pointer. If necessary, the operating system will add the value contained in V to a fixed value in order to remain at the beginning of the abacus counter. If the value in the abacus counter reaches that which corresponds to the pointer, the system will refuse to give the authorisation for use and the card will then be unusable. The card reader may possibly include a device making it possible to inform the owner of the card that he has used up his credit.

However, it can be noticed that in this first example of a use of a GPM 103 card, the eight bits of count level V only make it possible to define 256 addresses, whereas the abacus counter makes it possible to count 2120 tokens. It is thus possible to plan on different ways of using the system depending on the goals sought.

According to a first variation, the operating system is designed to add 1864 to the content of the pointer, thus making it possible to reach the maximum value of the abacus counter through increments of one unit. This corresponds to relatively high initial credit and to a relatively low possibility for a gain. In any case, it is necessary to allow for a minimum amount of consumable units from the start.

In a second variation, each incrementation of counter V is made to correspond to a certain number of units of the abacus counter and therefore each gain will provide an additional number of units greater than "one". It is thus possible to decide, for example, to set the initial value of the pointer to 72 and to set the value of each one-unit increment of counter V to 8 units in the abacus counter.

In a third variation, the figure determined by counter V can be used directly to set the address of the corresponding bit in the abacus counter. In this manner, if counter V contains the FIG. 10, the pointer will designate the second bit of counter C8. It can be seen that in this manner, upon incrementation of counter V, the incrementation of the pointer yields an increasingly strong gain. This arrangement can be useful in certain games in order to stimulate the player's interest as he wins. Nevertheless, this progression can be limited by incrementing the abacus counter itself by the number of units necessary in order for the difference between the shift of the pointer and the number of units consumed, including those thus added, to be equal to the gain obtained.

It can also be seen that in this case the eight bits of counter V make it possible to determine a number of addresses far greater than the number of bits in the abacus counter.

It can therefore be useful, in a sub-variation, to divide counter V into two parts, with a first part comprising five bits being more than enough to determine the desired address in the abacus counter, and with a second part containing three bits which will make it possible to determine those additional bits to be incremented in the abacus counter.

Figure 5:
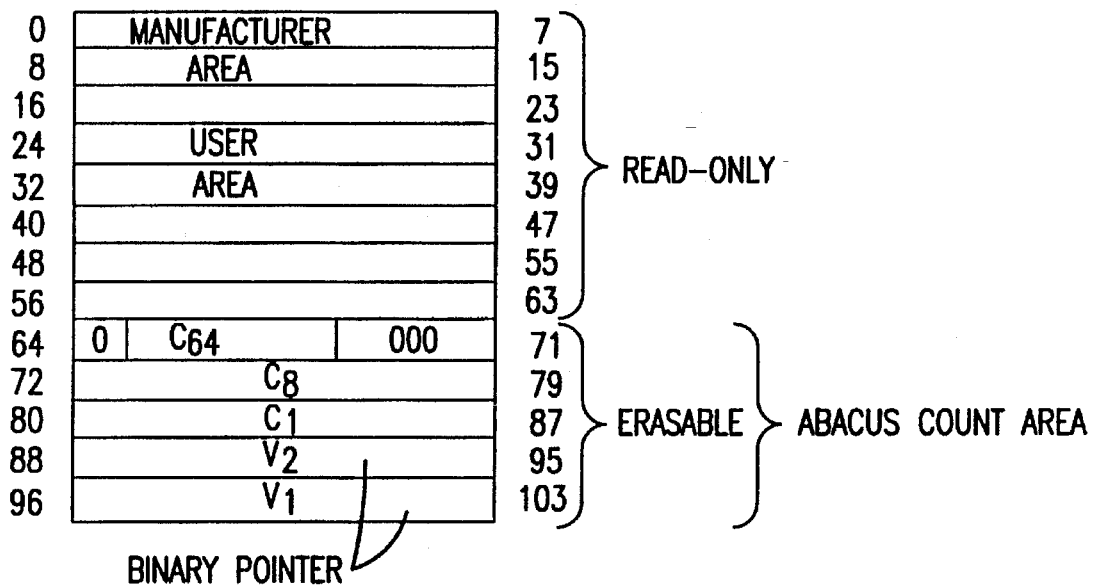
FIG. 5 is a mapping of a memory making it possible to implement the invention according to yet another preferred embodiment.

Finally, as shown in FIG. 5, it also possible to use the count area in another manner, for example by reserving the two counters V1 and V2 to determine the pointer and the three counters C1, C8 and C64 to determine the number of consumable units. It can be noticed that in this case the system is unbalanced in the other direction with respect to the one described above, in the sense the pointer's addressing capabilities are far greater than those of the abacus counter. This problem only arises because in this example we have described the use of a card which is available, making a simple and quick implementation possible through the programming of physical means available on the market. This does not take anything away from the generality of the invention, which can be perfectly implemented using physical means adapted to its definition in an exact manner and containing a pointer memory perfectly adapted to the abacus memory.

What is claimed is:

1. An apparatus for electronic payment comprising:
    a memory including i) an erasable counter that represents a number of units consumed by writing a series of cells one after another while counting one bit each time and ii) a pointer that represents a face value in binary code;
    wherein said erasable counter is decremented in steps which correspond to a unit of payment until said counter is equal to said pointer, and said pointer is incremented, without removing said memory from said machine, when a gain is achieved in response to a random external event.

2. A method of electronic payment comprising:
    providing a memory with i) an erasable counter that represents a number of units consumed by writing a series of cells one after another while counting one bit each time and ii) a pointer that represents a face value in binary code;
    inserting said memory into a machine;
    decrementing said erasable counter in steps which correspond to a unit of payment until said erasable counter is equal to said pointer;
    stopping said decrementing; and
    incrementing said pointer, without removing said memory from said machine, when a gain is achieved in response to a random external event.

3. A method of electronic payment comprising:
    providing a memory with i) an EPROM counter that represents a number of units consumed and ii) a pointer that represents a face value;
    inserting said memory into a machine;
    decrementing said counter in steps which correspond to a unit of payment, in an irreversible manner, until said counter is equal to said pointer;
    stopping said decrementing; and
    incrementing said pointer, without removing said memory from said machine, when a gain is achieved in response to a random external event.

4. The method of electronic payment according to claim 3, wherein providing the memory includes providing the memory with
    a consumable units area corresponding to the pointer before said pointer is incremented; and
    a potentially consumable units area,
    wherein a boundary between the said consumable units area and said potentially consumable units area is defined by the pointer.

5. The method of electronic payment according to claim 3, wherein providing said memory includes providing a single memory device having a one part which makes up said counter and another part which makes it possible to store the value of said pointer.

6. The method of electronic payment according to claim 3, wherein providing said memory includes providing a memory that is contained within a smart card.

7. The method of electronic payment according to claim 3, wherein inserting said memory into said machine includes inserting said memory into a gambling machine.

* * * * *